Figure 1:
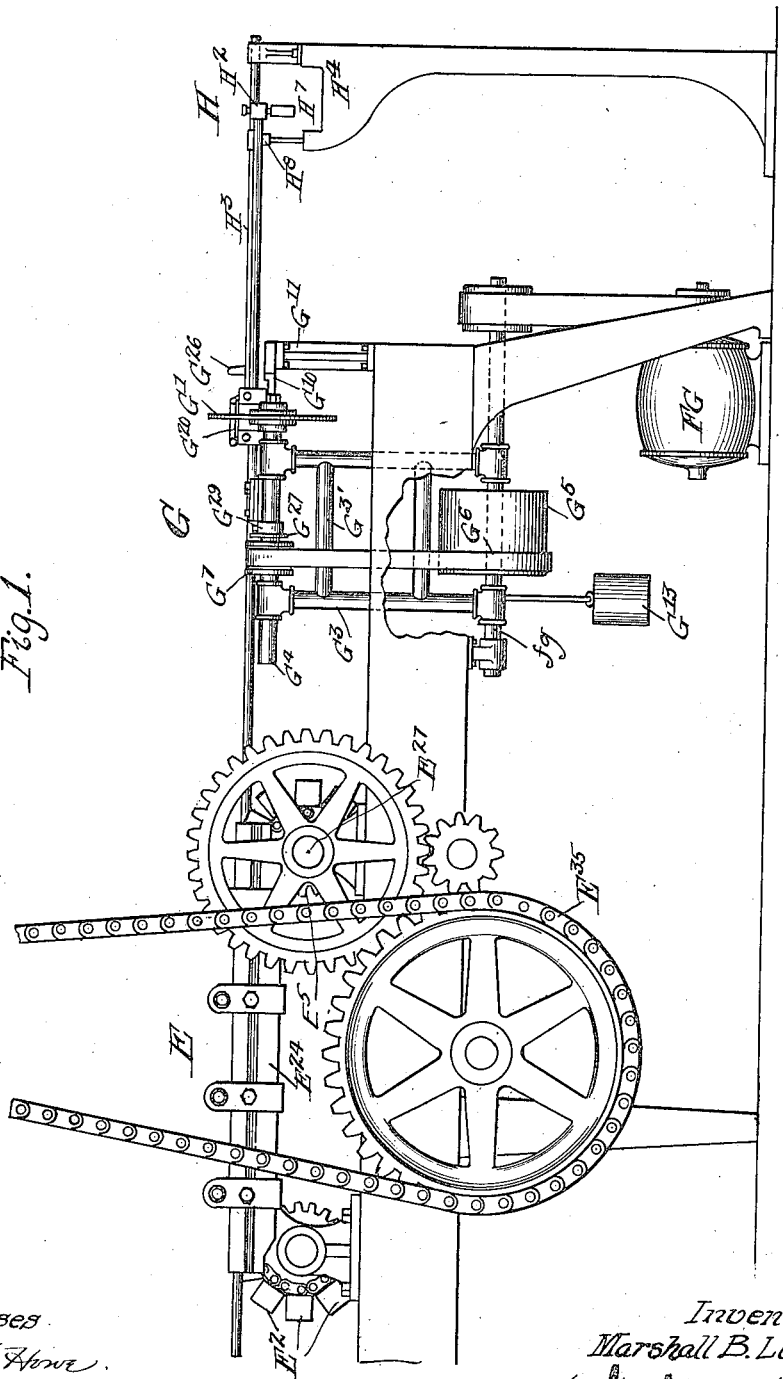

M. B. LLOYD.
CUT-OFF MECHANISM.
APPLICATION FILED APR. 15, 1912.
1,124,762.
Patented Jan. 12, 1915.
7 SHEETS—SHEET 2.
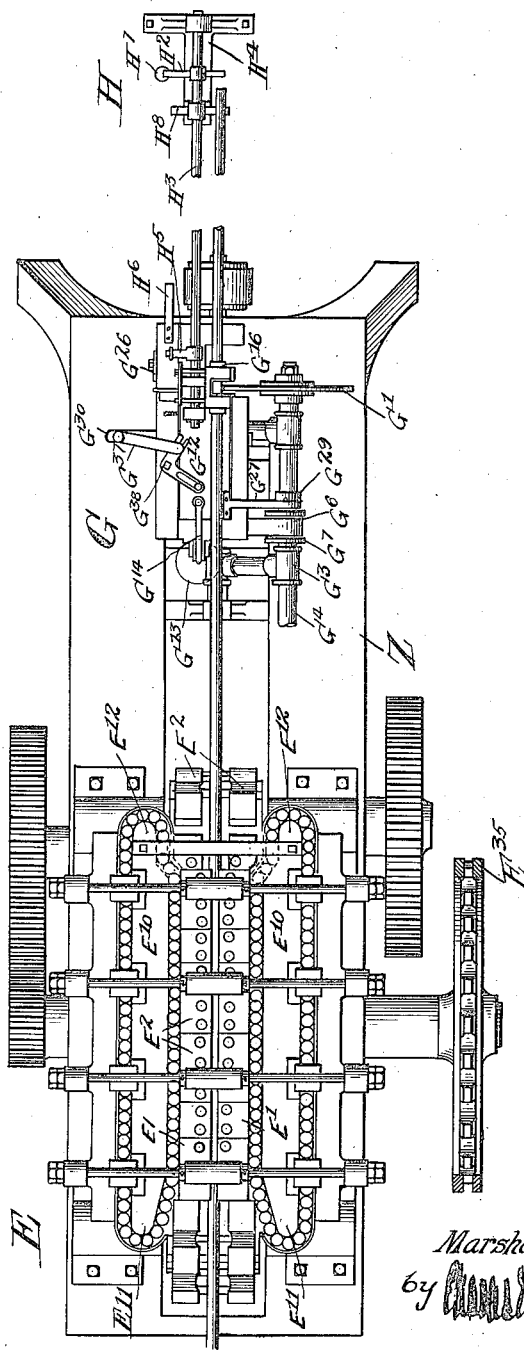
Fig. 2.
Witnesses
Inventor
Marshall B. Lloyd
by 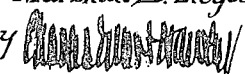
Atty.

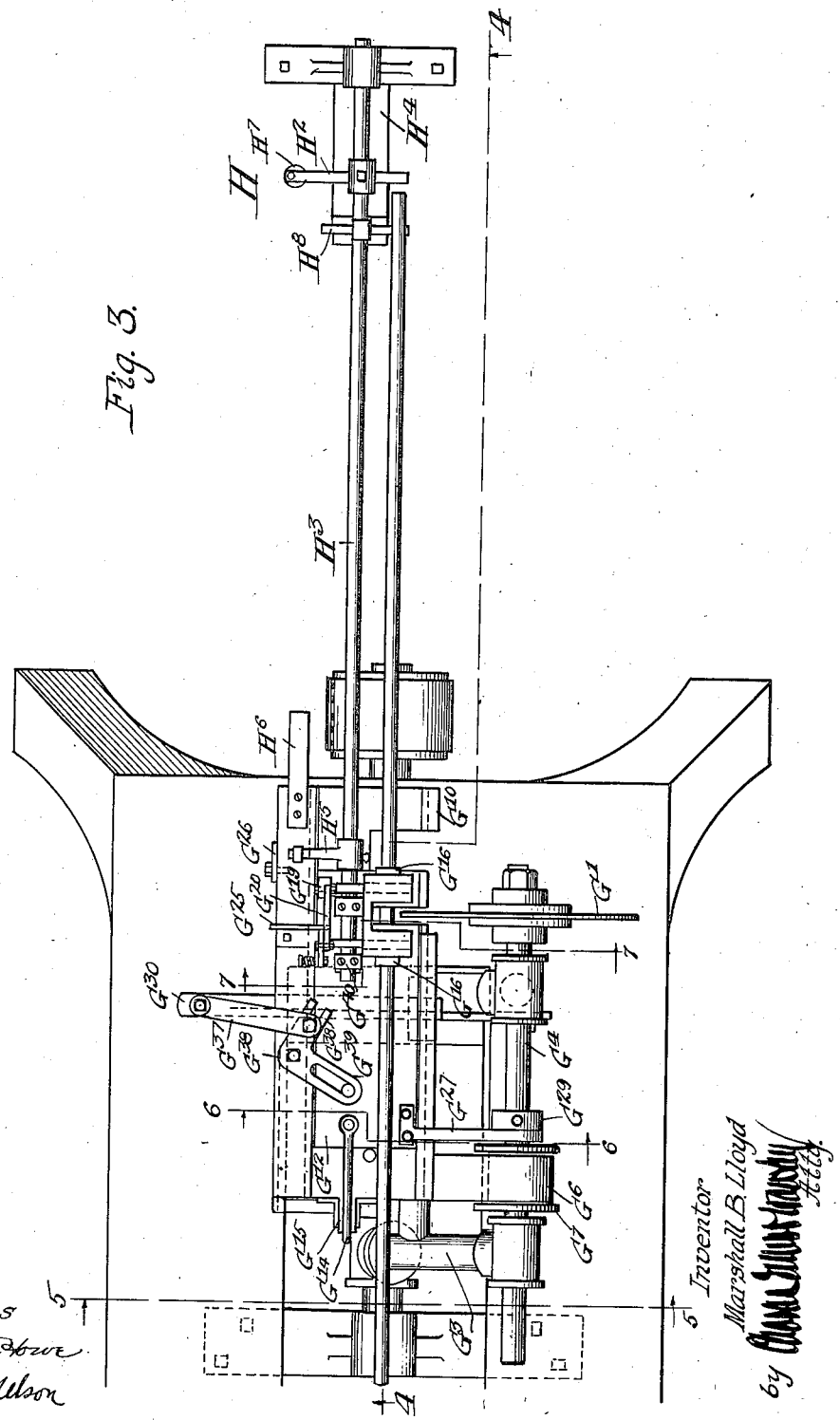

M. B. LLOYD.
CUT-OFF MECHANISM.
APPLICATION FILED APR. 15, 1912.
1,124,762.
Patented Jan. 12, 1915.
7 SHEETS—SHEET 4.
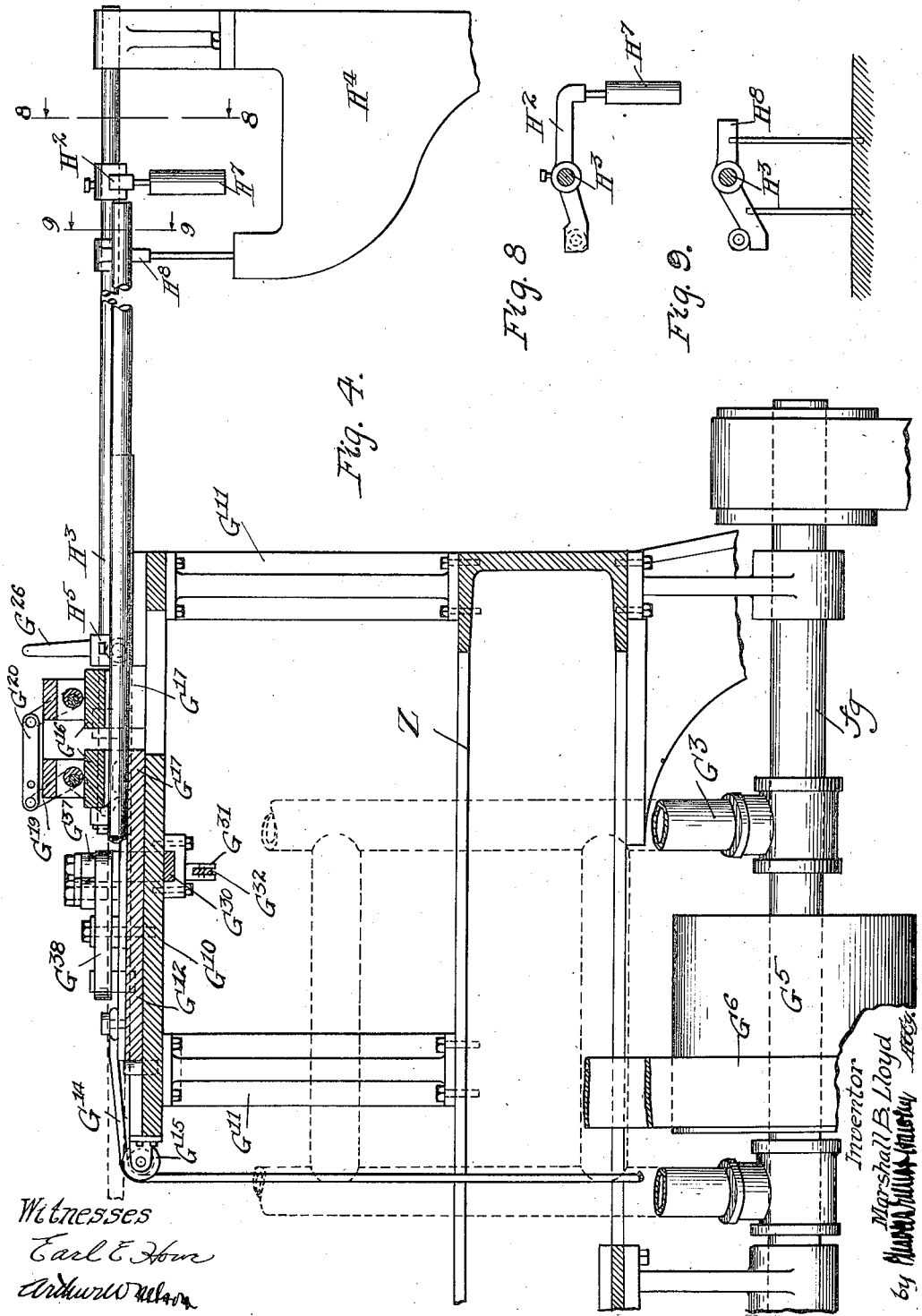

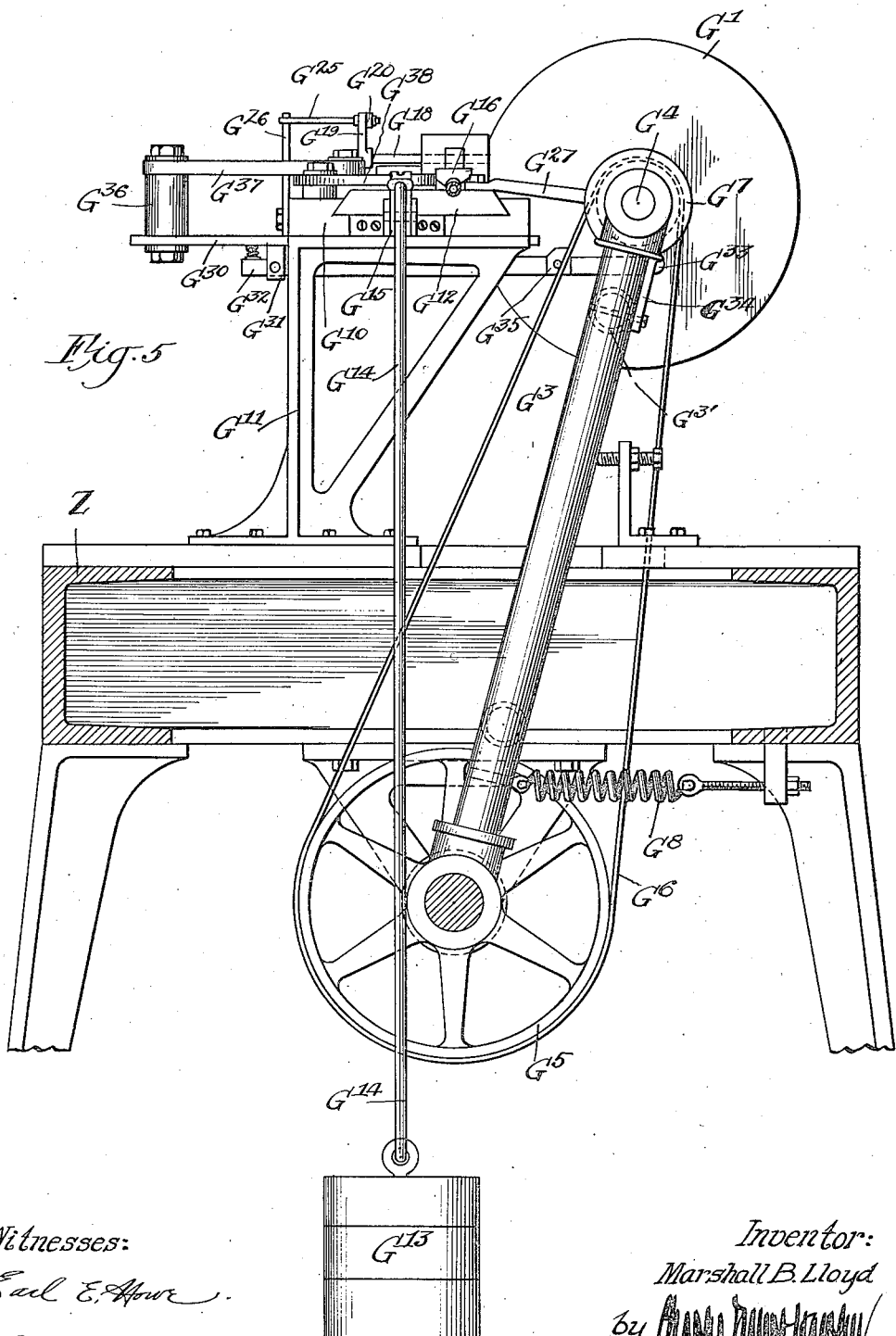

M. B. LLOYD.
CUT-OFF MECHANISM.
APPLICATION FILED APR. 15, 1912.
1,124,762.
Patented Jan. 12, 1915.
7 SHEETS—SHEET 6.
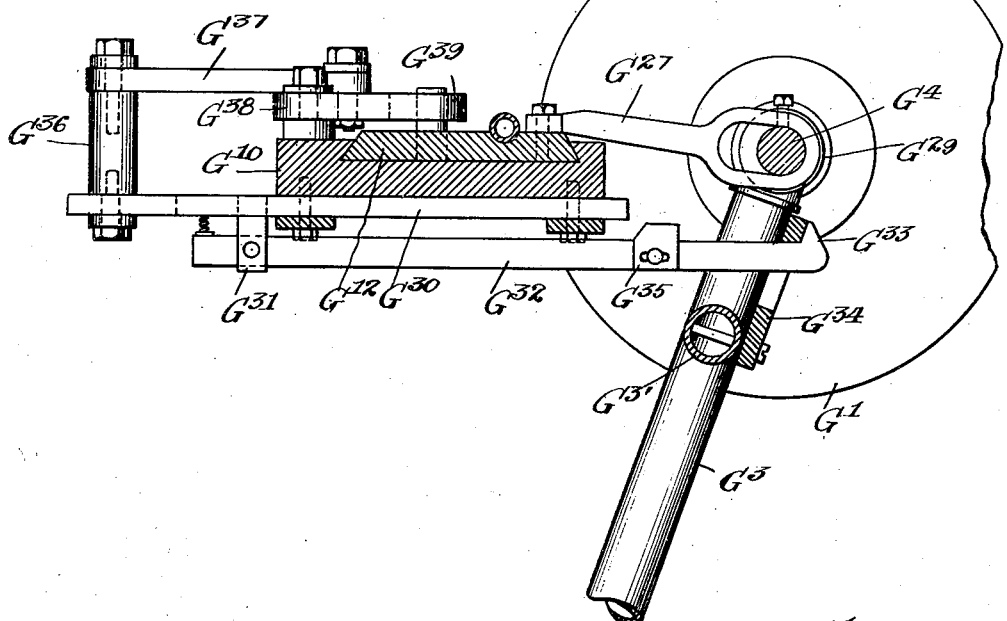
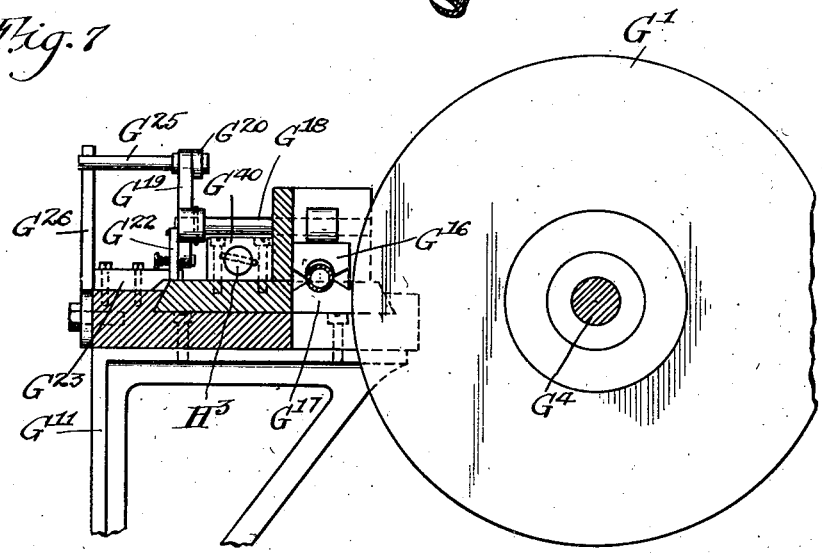
Witnesses
Earl E. Howe
Arthur W. Nelson
Inventor
Marshall B. Lloyd
by [signature]
Atty.

M. B. LLOYD.
CUT-OFF MECHANISM.
APPLICATION FILED APR. 15, 1912.
1,124,762.
Patented Jan. 12, 1915.
7 SHEETS—SHEET 7.
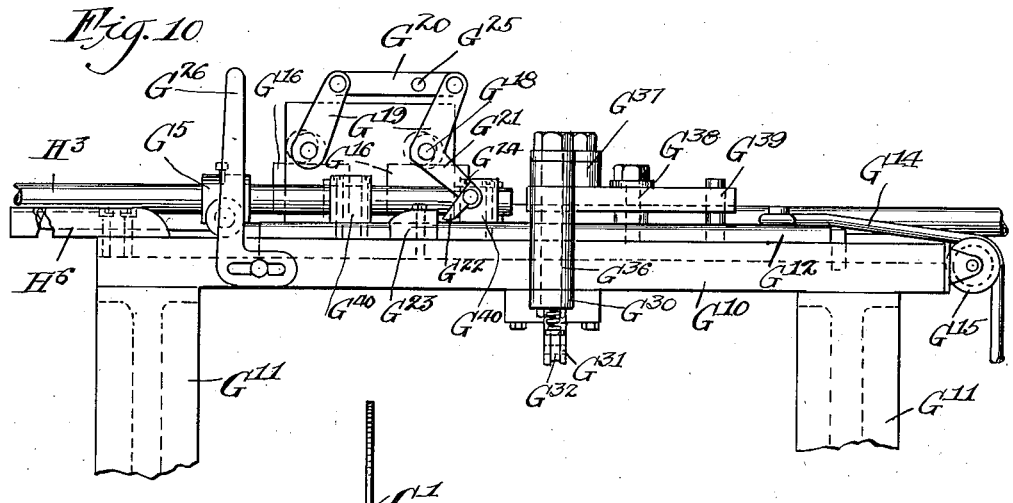
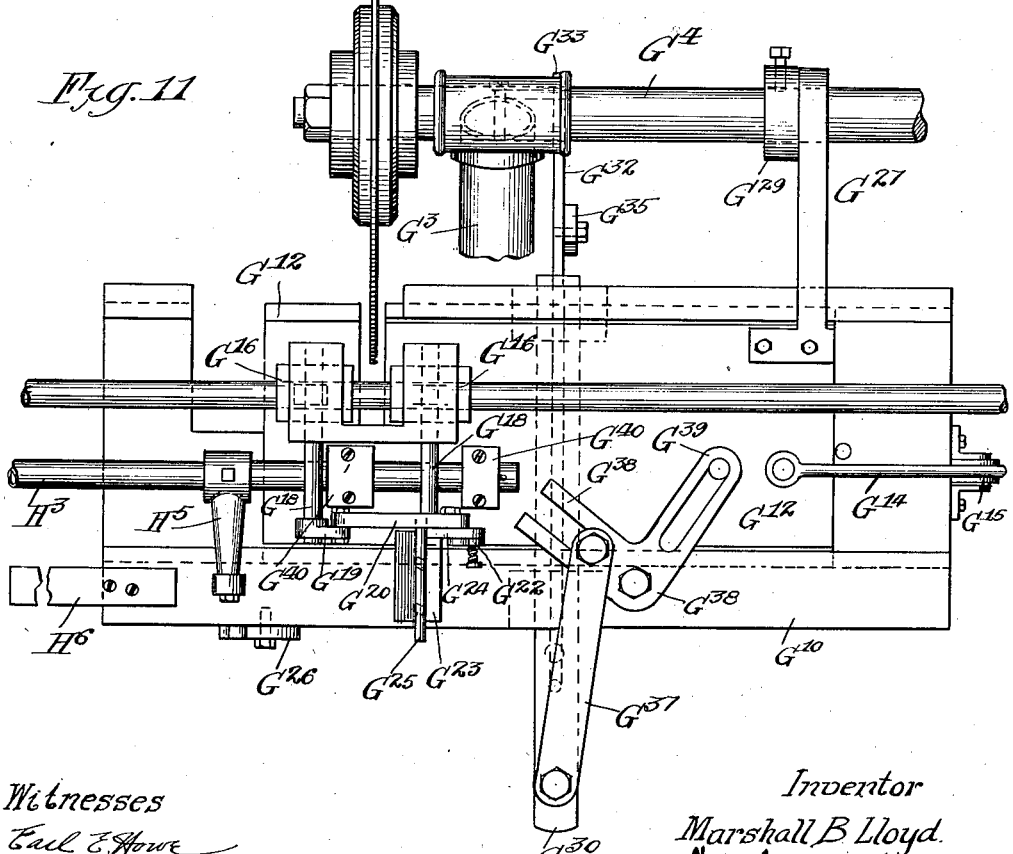
Witnesses
Earl E. Howe
Arthur W. Nelson
Inventor
Marshall B. Lloyd.
by
Atty.

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

CUT-OFF MECHANISM.

1,124,762.  Specification of Letters Patent.  Patented Jan. 12, 1915.

Original application filed July 12, 1911, Serial No. 638,203. Divided and this application filed April 15, 1912. Serial No. 690,936.

*To all whom it may concern:*

Be it known that I, MARSHALL BURNS LLOYD, a citizen of the United States, and a resident of Menominee, Menominee county, Michigan, have invented certain new and useful Improvements in Cut-Off Mechanism for Machines for Manufacturing Metal Tubes, of which the following is a specification.

My invention relates generally to machines for manufacturing such metal articles as tubing, and has particular reference to an improved mechanism for measuring and cutting off metal tubing.

The object of my invention is to provide a mechanism which shall be adapted to measure and cut off metal tubing, and particularly thin-walled metal tubing, more rapidly, more perfectly, more economically and with much less manual labor than has been possible hitherto.

A special object of my invention is to provide a measuring and cutting off mechanism which shall be adapted to receive tubing from a continuous tube-forming, shaping or welding mechanism and reduce the tubing to pieces of definite ascertained lengths without manual handling or intervention, and without hindering the operation of such mechanism or stopping the movement of the tubing.

This present application is a division of my application filed July 12, 1911, Serial No. 638,203, entitled Continuous-Tube Mill, now Patent No. 1,027,865, granted May 28, 1912.

My invention consists generally in mechanism for imparting longitudinal movement to the tubing or other article to be cut, in combination with a cut-off device positioned at one point in the path of the tubing or article, means for measuring or determining the length of successive end portions of the tubing or article as it emerges from the mechanism which imparts movement to it, and means operatively joining said measuring means and cut-off device and adapted to first cause the movement of the cut-off device in consonance with the tubing or article, and to then cause said device to sever the tubing or article without at any time interrupting the movement of the tubing or article.

My invention also comprises various novel constructions and combinations of parts, all as hereinafter described, and particularly pointed out in the appended claims.

My invention will be more readily understood by reference to the accompanying drawings, forming part of this specification, and in which:

Figure 1 is a partial side elevation of a continuous tube mill equipped with a cut-off mechanism embodying my invention; Fig. 2 is a plan view thereof; Fig. 3 is an enlarged plan view of the measuring and cutting off mechanism; Fig. 4 is a vertical, longitudinal section on the line 4—4 of Fig. 3, enlarged, showing details of the measuring and cut-off mechanisms; Fig. 5 is an enlarged transverse vertical section on the line 5—5 of Fig. 3; Fig. 6 is a still further enlarged sectional detail of the cut-off mechanism, the section being taken on the line 6—6 of Fig. 3; Fig. 7 is a similar view on the line 7—7 of Fig. 3; Fig. 8 is an end view of the adjustable gage of the cut-off mechanism as seen from the line 8—8 of Fig. 4; Fig. 9 is a like end view of the tube-supporting arm adjacent to the gage, as seen from the line 9—9 of Fig. 4; Fig. 10 is a side view of the cut-off mechanism, disclosing the parts which operate the tube clamps; and Fig. 11 is an enlarged plan view of the parts shown in Fig. 10.

The complete apparatus, or mechanisms, herein partially illustrated is a continuous tube mill, shown and described in my said Patent No. 1,027,865.

This present invention is in no wise limited to the precise machine herein illustrated, for it may readily be modified and adapted to other uses by one who is skilled in the art, without departing from the scope of the invention as set forth in the appended claims.

In the drawings Z represents a strong table or bench which supports the several operating parts of the machine. At one end of this bench is a continuous vise or draft mechanism E adapted to receive tubing from any suitable source of supply, such as a continuous tube forming mechanism and to propel it through the measuring and cutting off mechanism. Next to the draft mechanism is the cut-off mechanism G. At a convenient distance from the cut-off mechanism is a suitably supported adjustable measuring or gage mechanism H, connected with the cut-off mechanism in the manner hereinafter described.

The working parts and faces of the several mechanisms on the bench are preferably arranged in longitudinal working alinement, and any given piece or length of tubing material which occupies these parts of the machine, considered from end to end thereof, is held in straight line, non-distorted condition, while it (such piece or length) is being acted upon by the mechanisms E and G.

Preferably the tubing is fed to the cut-off device by a vise-like continuous propelling mechanism which comprises two opposed gripping portions $E^1$ $E^1$ divided into and composed of pairs of sections or jaws $E^2$ which move successively into alinement with and automatically clamp the tubing to propel it forward through the cut-off mechanism. The jaws are automatically closed upon the tube by mechanism which causes them to exert a clamping pressure upon the tubing. In this machine the pressure mechanism comprises two parallel bars or guide members $E^{10}$ lying parallel with the moving chains and forming the upper side of the moving chains and forming a groove or channel through which the jaw sections travel in succession. The forward ends $E^{11}$ of these pressure guides are flared or arranged as cams so that as the jaws rise upward and enter the forward end of the channel they are caused to gradually move toward each other and into clamping engagement with the tube, in which condition they are maintained until they reach a spreader at the opposite end of the channel. The opposite ends $E^{12}$ of the guide members are also flared or cut away so as to allow the jaws to open as the spreader enters between them. The guide members are mounted upon the bed plate $E^{24}$ of the machine.

The vise derives its power from the rear shaft $E^{27}$ on which the rear sprockets $E^5$ are mounted and through the medium of a train of speed reducing gears driven from any suitable source of power.

The particular invention disclosed and claimed in this present application lies in the cutting and measuring mechanisms and in the combination of those mechanisms with a propelling device, such as the continuous vise herein shown, and by means of which the article operated upon by the cutting and measuring mechanisms is continuously moved forward into operative relation to and with said mechanisms.

The cutting of the tubing into lengths is an essential part of the process of continuously manufacturing such articles as tubing, and I accomplish this by the mechanisms G and H which automatically measure the tubing and cut off the measured lengths while the tubing is in movement and without interrupting the continuous operation of the vise or of other parts of the machine with which the vise may be associated. For this purpose I provide a gage $H^2$ which, when the proper length of tubing is formed, automatically acts in conjunction with the traveling vise to put the cutting mechanism into operation and both move with the tubing at tube speed while the cutting operation takes place. This mechanism, comprises, preferably, an automatic cut-off device which firmly clamps the tubing, travels in unison with the tubing i. e., at tube speed until it severs the length measured off by the gage, automatically releases its hold upon and discharges the tubing and finally returns to its normal condition ready for the next operation. The gage $H^2$, when set, marks the outer end measuring point and the cutter $G^1$ marks the inner end measuring point upon the tubing.

The cutter $G^1$ is mounted upon a horizontal shaft or saw arbor $G^4$ which is carried in bearings on the upper end of a swing frame $G^3$. This frame is strengthened by cross bars $G^{3\prime}$ and is adapted to be swung transversely of the bed of the machine and thereby carry the saw through the path of the moving tubing to sever it. The spiral spring $G^8$ serves to return the cutter frame after it has been swung to cut the tubing. The cutter shaft $G^4$ is adapted to slide longitudinally through its bearings and I connect it with the carriage $G^{12}$ for causing the cutter with its arbor to move bodily with the moving tubing while the tubing is being severed by the cutter. The swing frame $G^3$ is mounted to swing upon a shaft $fg$ as upon a hinge. This shaft $fg$ is parallel with the shaft $G^4$ and is carried in suitable bearings bolted to the bed Z of the machine. The shaft $fg$ may be driven from any suitable source of power, such as the electric motor FG which is bolted thereto. The shaft $fg$ carries a wide pulley $G^5$ and the cutter shaft is driven by a belt $G^6$ running over a flanged pulley $G^7$.

The motions of the cutter are controlled by the tubing and the measuring gage $H^2$ through the medium of mechanism now to be described.

A stationary table $G^{10}$ on brackets $G^{11}$ supports a sliding carriage $G^{12}$, movable parallel with the tubing. The carriage after operation is retracted by a weight $G^{13}$ connected thereto by cable $G^{14}$ passing over pulley $G^{15}$. The tube clamps are mounted on the carriage in the path of the tubing as it is propelled by the vise. Each clamp comprises a movable jaw $G^{16}$, and a fixed jaw $G^{17}$, the former arranged for operation by the measuring device $H^2$. The cutter works in the gap between the clamps. The upper jaws $G^{16}$ are operated in unison by cam shafts $G^{18}$ connected by arms $G^{19}$ and strap $G^{20}$. One of the arms is a bell crank, having an additional arm $G^{21}$ which carries a trigger $G^{22}$ engageable with a projection $G^{23}$ on the table $G^{10}$. In one direction the trigger is limited by a stop shoulder $G^{24}$ on the bell crank and when the carriage begins to move forward the trigger strikes the stationary projection $G^{23}$ and operates the cam shafts and clamps to connect the carriage to the tube. In returning, the trigger passes freely over the projection $G^{23}$.

The clamps are released at the end of the forward movement, after the cutting operation, by the engagement of a rod $G^{25}$, which is secured rigidly to the strap or link $G^{20}$, with an arm $G^{26}$ upstanding from the stationary table, which engagement swings the cams of the clamps in the opposite direction to open the clamps. The traveling motion of the cutter is brought about by means of a lateral arm or extension $G^{27}$ rigidly secured to the carriage $G^{12}$ and movable with it. The free end of this arm has a slotted connection with the cutter shaft $G^4$ and operates between a set collar $G^{29}$ and the flanged pulley $G^7$ both fixed on the shaft $G^4$. This moves the cutter in unison with the carriage $G^{12}$. The slotted connection permits the transverse movement of the cutter.

For causing the transverse or swing motion of the frame $G^3$ and cutter, I provide a transversely slidable bar $G^{30}$ mounted in guides beneath the table and having a depending lug $G^{31}$ which constitutes the fulcrum for a latch bar $G^{32}$ extending through the upper portion of the swinging cutter frame and having a hooked end $G^{33}$ for engagement with a latch $G^{34}$ on the swinging cutter frame shown in Fig. 6. The latch bar $G^{32}$ is held in position (shown in Fig. 6) by a spring between its short arm and the bar $G^{30}$.

The bar $G^{30}$ slides in guides on the bottom of the table $G^{10}$. Sliding movement is imparted by a bell crank $G^{35}$ pivoted on the table $G^{10}$. Its arm $G^{39}$ is connected by a slot and pin connection to the carriage $G^{12}$ for operation by its movement. The bell crank $G^{38}$ operates the bar $G^{30}$ through link $G^{37}$ and post $G^{36}$. The link $G^{37}$ has an adjustable or variable throw connection with the bell crank $G^{38}$, as shown in Fig. 11. Forward movement of the carriage $G^{12}$ causes the bar $G^{30}$ to move the swinging cutter frame toward the tubing to sever the tubing. The final movement of the bars $G^{30}$ and $G^{32}$ releases the cutter frame through the striking of an adjustable cam projection $G^{35}$ on the bar $G^{32}$, against the table $G^{10}$, and retracts the hook $G^{33}$ from engagement with the swinging frame. The cutter frame is thereupon returned by the spring $G^3$ before mentioned. As previously stated, the cutter marks the inner end measuring point of the tube, and as the carriage always moves with the cutter it may be employed to operatively join the gage $H^2$ and the cutter. The connection comprises a rod $H^3$ rotatively mounted but longitudinally fixed in blocks $G^{40}$ on the carriage $G^{12}$. The rod parallels the tubing. Its outer end is supported by a movable standard $H^4$, in which it may slide. The length of the rod exceeds the length of the longest tube to be made. The rod carries the gage $H^2$ which is in the form of a cross arm, adjustable on the rod, as required to measure and determine the length of succeeding tubes.

One or more supports or guides $H^8$ are used to sustain the tube in its travel. These supports are stationary. They serve to direct the end of the tubing against the gage. Whenever this happens, the gage will be thrust forward, and this movement being communicated to the carriage $G^{12}$ through the rod $H^3$, the carriage will be clamped to the tubing and the tubing will be severed by the cutter as before explained. The inner end of the rod $H^3$ has a rocker arm $H^5$ which in the final forward movement of the rod and carriage rides upon a stationary cam $H^6$. This action rotates the rod $H^3$ and removes the gage $H^2$ from the end of the severed tube, freeing both the tube and cutter carriage, whereupon the carriage and the rod are retracted by the weight $G^{13}$ acting through the cable $G^{14}$ before described; meantime the rod is restored by a weight $H^7$ on the cross arm or gage $H^2$.

The principal source of power for the machine is in the chain belt $E^{35}$ which drives the continuous vise E. The latter, as it will now be understood, firmly engages the tubing and it forcibly projects the finished tubing through the cut-off mechanism G, and against the measuring gage $H^2$. Very little power from the motor FG is required to rotate the cut-off saw or grinder.

In manufacturing commercial lengths of tubing, upon the above described machine, I preferably weld or otherwise connect the formed tubing end to end in continuing series and thereby in effect maintain a continuous source of supply of finished tube and consequently the resultant waste due to the production of pieces shorter than desired is eliminated.

While the machine herein illustrated is constructed to produce tubing in desired lengths, I wish it to be understood that my invention is adapted to the production of similar or different metal articles. Indeed, various modifications of my invention and various combinations and uses of the mechanism herein described, all within the scope of my invention, will readily suggest themselves to one who is skilled in the art.

Having thus described my invention, I claim as new, and desire to secure by Letters Patent:

1. A machine of the class described comprising means for forcibly impelling a continuous article in a straight line, in combination with a clamping device for firmly gripping said article, said clamping device being operated by the moving article, cut-off mechanism adapted to sever said article, and a gage adapted to measure the lengths to be cut and to actuate said clamping and cut-off mechanism, all during the movement of the article.

2. A machine of the class described comprising means for moving an article of indefinite length continuously forward, an end-length cut-off mechanism, a measuring device and a clamping and holding device, all adapted to be periodically moved by and to move with the article and periodically cut predetermined end-lengths from the end thereof, and automatic means for controlling the return of said parts to normal position after each cutting operation.

3. A machine for cutting tubing and the like into predetermined lengths, comprising an endless rotary vise having an elongated working stretch adapted to grasp and longitudinally propel the tubing, a movable gage disposed in line with said working stretch to be struck by the end of the tubing delivered by said vise, a cut-off device member upon which said device is operatively mounted, means through the medium of which the movement of said gage by the tubing is communicated to said member to move the same and the cutter in unison with the tubing and suitable means for actuating said cutter during the movement of said member, substantially as described.

4. A continuous mill adapted to convert substantially continuous tubular metal stock into tubes of respectively definite lengths, comprising means for moving the stock in combination with a measuring mechanism, a cut-off device and means controlled by said measuring mechanism and causing said cut-off device to clamp the stock, move with and sever successive end portions of the stock at intervals and in lengths determined by said measuring mechanism.

5. In a device of the class described, means for steadily moving an article of indefinite length forward, in combination with automatic cut-off mechanism for cutting successive end lengths from said article without interruption in the movement thereof, said mechanism comprising a movable carriage, a member connected thereto and arranged in the path of the article, the article engaging same and thereby moving the carriage, and mechanism operable by movement of the carriage to move a cutter longitudinally with and transversely into the tube.

6. In a device of the class described, means for projecting an article of indefinite length, in combination with mechanism for automatically cutting successive end lengths from the article, said mechanism comprising a movable carriage arranged in the path of the article to be cut, clamping means arranged on the carriage, a member secured to the carriage and extending into the path of the tube, said carriage being moved by the tube engaging said member attached to the carriage, the movement of the carriage actuating mechanism also serving to actuate the means for clamping the article.

7. In mechanism of the class described, means for moving an article forward, a movable carriage arranged in the path of the article, clamping mechanism mounted on the movable carriage, a draw rod attached to the carriage extending therefrom into the path of the article to be cut, said carriage being moved forward at tube-speed when the article engages the draw rod, and mechanism operated by the forward movement of the draw rod to clamp the article to be cut.

8. In mechanism of the class described, means for moving an article forward, a movable carriage arranged in the path of the article, clamping mechanism mounted on the movable carriage, a draw rod attached to the carriage extending therefrom into the path of the article to be cut, said carriage being moved forward at tube-speed when the article engages the draw rod, mechanism operated by the forward movement of the draw rod to clamp the article to be cut, and mechanism operating to release the clamps after the cutting of the tube.

9. In mechanism of the class described, means for moving an article forward, a movable carriage arranged in the path of the article, clamping mechanism mounted on the movable carriage, a draw rod attached to the carriage extending therefrom into the path of the article to be cut, said carriage being moved forward at tube-speed when the article engages the draw rod, mechanism operated by the forward movement of the draw rod to clamp the article to be cut, a cutting member mounted for longitudinal and transverse movement, and means operated by the movement of the carriage to cause longitudinal and transverse movement of the cutting member.

10. A machine for cutting tubing and the like into predetermined lengths, comprising mechanism for propelling tubing, a movable carriage, tube-clamping mechanism arranged on the carriage in line with the tubing, a draw rod attached to the carriage and extending forward in the path of the tube to be struck thereby to cause forward movement of the carriage, and mechanism operated by the forward movement of the carriage to clamp the tube in combination with a cutting member arranged for longitudinal and transverse movement, mechanism operable by movement of the carriage to cause longitudinal and transverse movement of the cutting member, and means for returning the carriage and cutting member to initial position after the cutting operation.

In testimony whereof, I have hereunto set my hand, this 5th day of April, 1912, in the presence of two subscribing witnesses.

MARSHALL BURNS LLOYD.

Witnesses:
CHARLES GILBERT HAWLEY,
C. O. PORTERFIELD.